US011953883B2

(12) United States Patent
Femböck

(10) Patent No.: US 11,953,883 B2
(45) Date of Patent: Apr. 9, 2024

(54) LIFTING SYSTEM AND METHOD FOR CONTROLLING THE LIFTING SYSTEM AND CONTROL SYSTEM FOR THE LIFTING SYSTEM

(71) Applicant: Gerhard Finkbeiner, Freudenstadt (DE)

(72) Inventor: Josef Femböck, Neuötting (DE)

(73) Assignee: Gerhard Finkbeiner, Freudenstadt (DE)

( * ) Notice: Subject to any disclaimer, the term of this patent is extended or adjusted under 35 U.S.C. 154(b) by 522 days.

(21) Appl. No.: 17/271,912

(22) PCT Filed: Jul. 29, 2019

(86) PCT No.: PCT/EP2019/070356
§ 371 (c)(1),
(2) Date: Feb. 26, 2021

(87) PCT Pub. No.: WO2020/048682
PCT Pub. Date: Mar. 12, 2020

(65) Prior Publication Data
US 2021/0318669 A1  Oct. 14, 2021

(30) Foreign Application Priority Data

Sep. 3, 2018 (DE) ..................... 10 2018 121 431.6
Dec. 18, 2018 (DE) ..................... 10 2018 132 735.8
Jan. 29, 2019 (DE) ..................... 10 2019 102 138.3

(51) Int. Cl.
*G05B 19/4155* (2006.01)
*B66F 3/46* (2006.01)
(Continued)

(52) U.S. Cl.
CPC ............ *G05B 19/4155* (2013.01); *B66F 3/46* (2013.01); *G08C 17/02* (2013.01); *G08C 23/04* (2013.01);
(Continued)

(58) Field of Classification Search
CPC ...... G05B 19/4155; G05B 2219/45014; G05B 19/04; B66F 3/46; B66F 9/24;
(Continued)

(56) References Cited

U.S. PATENT DOCUMENTS 2,350,919 A * 6/1944 Pearson .................. B23B 47/28
408/16
4,850,783 A * 7/1989 Maekawa ............ B65G 1/1378
414/268
(Continued)

FOREIGN PATENT DOCUMENTS

DE  202012104857 U1  5/2013
DE  112015001913 T5  2/2017
(Continued)

OTHER PUBLICATIONS

International Search Report and Written Opinion dated Mar. 3, 2020 for corresponding International Patent Application No. PCT/EP2019/070356.

*Primary Examiner* — Ramesh B Patel
(74) *Attorney, Agent, or Firm* — Renner, Otto, Boisselle & Sklar, LLP

(57) ABSTRACT

The invention relates to a lifting system and a method for controlling the lifting system, as well as a control system for a lifting system of this type in which an evaluation signal and a control signal are transmitted in order to actuate the lifting devices.

17 Claims, 5 Drawing Sheets

Figure 1:
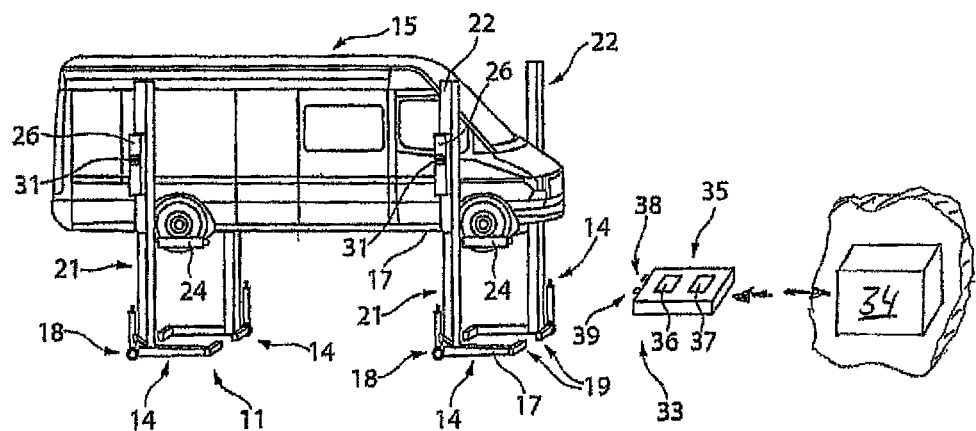

(51) Int. Cl.
*G08C 17/02* (2006.01)
*G08C 23/04* (2006.01)

(52) U.S. Cl.
CPC .............. *G05B 2219/45014* (2013.01); *G08C 2201/20* (2013.01)

(58) Field of Classification Search
CPC .... G08C 17/02; G08C 23/04; G08C 2201/20; G08C 2201/71; G08C 2201/92
See application file for complete search history.

(56) References Cited

U.S. PATENT DOCUMENTS

| | | | | |
|---|---|---|---|---|
| 5,338,150 | A * | 8/1994 | Focke | B65G 47/90 414/792.9 |
| 7,915,841 | B2 * | 3/2011 | Griessnig | F16P 3/147 318/16 |
| 11,332,352 | B2 * | 5/2022 | Bowers | B66F 9/063 |
| 2008/0078868 | A1 * | 4/2008 | Lamoree | B64D 11/003 244/118.1 |
| 2016/0152454 | A1 * | 6/2016 | Stapensea | B66F 17/00 254/89 R |
| 2016/0224930 | A1 * | 8/2016 | Kadaba | B65G 1/16 |
| 2016/0272471 | A1 * | 9/2016 | Jaipaul | B66F 3/46 |
| 2018/0194601 | A1 * | 7/2018 | Van Houten | B66F 7/16 |
| 2020/0183362 | A1 * | 6/2020 | Ledwith | A61G 7/1061 |
| 2020/0264615 | A1 * | 8/2020 | Bryner | B25J 9/1617 |
| 2021/0122615 | A1 * | 4/2021 | Rauscher | B66C 13/063 |
| 2021/0276423 | A1 * | 9/2021 | Lombardo | B66F 9/12 |
| 2021/0318669 | A1 * | 10/2021 | Femböck | B66F 9/24 |
| 2023/0079238 | A1 * | 3/2023 | Cristache | G05D 1/0297 706/46 |

FOREIGN PATENT DOCUMENTS

| | | |
|---|---|---|
| DE | 102016218756 A1 | 3/2017 |
| EP | 1672385 A1 | 6/2006 |
| GB | 2350919 A | 12/2000 |
| WO | 2008116595 A2 | 10/2008 |

* cited by examiner

LIFTING SYSTEM AND METHOD FOR CONTROLLING THE LIFTING SYSTEM AND CONTROL SYSTEM FOR THE LIFTING SYSTEM

This application is a national phase of International Application No. PCT/EP2019/070356 filed Jul. 29, 2019, which claims priority to German Application No. 10 2018 121 431.6 filed Sep. 3, 2018, and German Application No. 10 2018 132 735.8 filed Dec. 18, 2018, and German Application No. 10 2019 102 138.3 filed Jan. 29, 2019, all of which are hereby incorporated herein by reference in their entireties.

The invention relates to a lifting system, in particular for lifting and lowering vehicles, which comprises a plurality of lifting apparatuses which can be actuated by a control system. The invention further relates to a method for controlling such a lifting system as well as to a system control for such a lifting system.

DE 11 2015 001 913 T5 describes a lifting system for lifting and lowering a vehicle and a method for controlling the lifting system. This lifting system comprises a plurality of lifting apparatuses, which are designed as mobile lifting apparatuses. Each of these lifting apparatuses comprises a load-bearing means which can be moved up and down and a control unit. The control units of the various lifting apparatuses are actuated by a central control device of the control system. This central control device may be stationary or mounted on a trolley. The central control device has a transmitter/receiver for communicating with the individual lifting apparatus and a calculation device and processor for determining required control operations. The central control device communicates with the lifting apparatuses wirelessly.

The safety requirements for lifting systems as well as for a method for controlling such lifting systems are constantly increasing. In particular, it must be ensured that, during the lifting and lowering of a load by the lifting system, an operator is outside a working area formed by the number of lifting apparatuses associated with each other. In particular, the user must not be below the lifting apparatuses or in the vicinity of moving parts of the lifting apparatuses or below the load to be lifted.

The object of the invention is therefore to propose a lifting system and a method for controlling a lifting system as well as a control system for such a lifting system, whereby increased safety is provided when actuating the lifting system.

The invention achieves this object by a lifting system in which a control unit is provided on each lifting apparatus of the lifting system and a control device is provided separately therefrom, each control unit and the control device comprising a transmitter/receiver in order to transmit control signals and, in addition, a data interface for wireless transmission of a presence signal being provided on each of the control units and on the control device, and the data interface of the control unit having a signal cone which is designed differently from the load-bearing means of the lifting apparatus. This makes it possible for the operator with the control unit to be at a sufficient safe distance from the lifting apparatus in order to actuate the lifting system. The orientation of the signal cone differently from the load-bearing means ensures that the user must stay outside the danger zone of the lifting apparatus, since otherwise an exchange of the presence signal and the control signal is not possible. The presence of both signals is necessary to actuate the lifting system. Furthermore, this arrangement has the advantage that the operator does not have to operate the lifting system directly at the lifting apparatus, and therefore he can stay at a sufficient safety distance from the lifting system.

In order to further increase operational safety, it is preferably provided that, when the presence signal and the control signal are received from the control device in a predetermined time window, the actuation of the apparatuses is enabled by the control unit. If the presence signal and the control signal are detected with a time offset outside a predetermined time window, a lifting and lowering of the lifting system cannot be started. In this way, it can be ensured that the operator is actually outside the danger zone and, for example, a continuous presence signal is simulated in order to emit a control signal from any location.

Furthermore, it is preferably provided that a working area is formed between two opposite or a plurality of pairs of opposite lifting apparatuses, and the signal cone of the data interface on the control unit is located outside this working area. This means that the operator must necessarily be outside the working area in order to position the control device within the signal cone of the data interface so that the presence signal and control signal can subsequently be detected by the control unit in the preferred time window.

The signal cone of the data interface is preferably oriented oppositely to the load-bearing means of the lifting apparatus. This allows the necessary safety distance to be created.

Furthermore, it is preferably provided that the signal cone of the data interface on the control unit is oriented horizontally or is inclined downwards with respect to a horizontal line. This enables the reduction of interferences, especially reflections of signals that could simulate the presence signal.

Furthermore, it is preferably provided that the signal cone of the data interface and the signal cone of the transmitter/receiver for the control signal are oriented identically. In this way, the position of the operator in relation to the lifting apparatus can be defined even more precisely for actuating the lifting system with a sufficient safety distance.

Furthermore, it is preferably provided that the data interface for the presence signal is formed by an IR receiver and an IR transmitter and that the control signal can be transmitted with a transmitter and receiver differing therefrom. This enables a simple and separate evaluation of the presence and control signal. In addition, the previous communication components for wireless communication of control signals, such as radio or WLAN, can be retained.

Furthermore, it is preferably provided that the control unit has a display for showing at least one operating status. Preferably, further functions can also be provided via this display for actuating the control system and/or the lifting system.

Furthermore, it is preferably provided that the control device comprises at least a display, a keypad and/or a charging interface for accumulators and/or exchangeable accumulators. This makes the control device mobile. Preferably, it can be provided that the control device has an exchangeable, in particular pluggable, display, also in the form of a smartphone, tablet or the like.

The actuation of the load-bearing means by the control unit is preferably only released if the control device is within the signal cone of the data interface and communicates with it and a simultaneous reception of the presence signal via the data interface and the control signal via the transmitter/receiver arranged separately to it is provided. This can further increase operational safety.

Advantageously, the control device is designed as a master and the control units as slaves. In this way, a remote control is formed by this control device, through which the lifting system can be actuated. The control device for actuating the lifting system can be assigned to each of the control units in order to then actuate the entire lifting system. This also makes it possible to simplify the design of the control units arranged on the lifting apparatuses. The control device thus communicates with each control unit.

Furthermore, it is preferred that the control device is designed as a portable hand-held device. This allows the operator to take up different positions in relation to the lifting system and from there to view the working area to see whether there might be a potential hazard in the operation of the lifting system.

Furthermore, it is preferably provided that a plurality of control devices are integrated into the control system of the lifting system and are coupled to each other. Particularly in the case of lifting systems which have six, eight, ten or more lifting apparatuses, it can be advantageous for two-man operation to take place. For this purpose, for example, control devices are also coupled to each other so that the lifting system can only be actuated when the two control devices are positioned simultaneously relative to one control unit and each receives a presence signal and control signal within a time window.

Preferably, the at least one mobile control device communicates with a stationary controller in the working area of the at least one lifting system. This stationary controller can be designed as a master. In particular, the controller can communicate as a master with the at least one mobile control device and/or, after activation of the at least one control unit by the control device, also directly with the control units operated as slaves. By positioning the at least one mobile control device relative to a particular lifting apparatus, a secured activation of the lifting system can be achieved. Subsequently, a central actuation of the at least one lifting apparatus can be made possible via the stationary controller. Alternatively, the stationary controller can also be designed as a communication interface. The stationary controller can be designed to function both as a master and as a communication interface. This stationary controller communicates with the at least one mobile control device operated as a master. This stationary controller can store and manage all data of the lifting system. The stationary controller can also have an interface for external access, for example for remote maintenance or a software update.

The at least one mobile control device can be operated as a master and can forward data and/or information and/or signals from the control unit(s) of the lifting apparatuses in the lifting system to the stationary controller.

The communication between the at least one mobile control device and the stationary controller can be implemented via radio, Bluetooth or other wireless connections.

Furthermore, it is preferably provided that the lifting apparatuses of the lifting system, according to a first embodiment, are designed as a single-column lifting apparatus. Such single-column lifting apparatuses are set up in pairs opposite each other. Preferably, each pair of single-column lifting apparatuses engages an axle of a vehicle. Alternatively, the lifting apparatus of the lifting system may be designed as a two-column lifting apparatus. In this embodiment, it is provided that two preferably pivotable support arms are provided on each lifting column and preferably engage a chassis. The two-column lifting apparatuses are preferably positioned opposite each other in mirror image along an axis in a working area. Another alternative embodiment of the lifting apparatus is an underfloor lifting apparatus. These underfloor lifting apparatuses are recessed in a floor. Advantageously, they are provided to be movable in a channel in the floor so that they are adjustable at a distance from each other to engage the vehicle at least in pairs. A further alternative embodiment of the lifting apparatus provides that it is designed as a rail lifting apparatus. Preferably, two rail lifting apparatuses oriented parallel to each other form a lifting system. A vehicle can drive completely onto these rail lifting apparatuses. A plurality of rail lifting apparatuses can also be arranged in series in order to accommodate longer vehicles or vehicles consisting of a plurality of parts.

The object forming the basis of the invention is further achieved by a method for controlling a lifting system consisting of a plurality of lifting apparatuses, in which a control system having a plurality of control units and a control device for actuating the lifting system is used, the control units and the control device having a transmitter and receiver, by means of which control signals are transmitted wirelessly, and the control device and the control units having data interfaces by means of which at least one presence signal of the control device is transmitted to a particular control unit, and the data interface being oriented by the control unit with a signal cone deviating from the orientation of the load-bearing means. Only after the control device has been positioned within the signal cone of the data interface of the control unit can an exchange of the presence signal and the control signal be detected. If the presence signal as well as the control signal are detected by the control unit, the control signal is forwarded to actuate the lifting system, i.e. the load-bearing means of the particular lifting apparatus are moved up or down or an emergency stop is performed.

Furthermore, it is preferably provided that, upon receipt of the presence signal and the control signal from the control device, the control unit releases the actuation of the lifting apparatuses within a time window. Preferably, the presence signal differs from the control signal. This increases safety when operating the lifting system.

Furthermore, it is preferably provided that if the control unit receives the presence signal and the control signal at the same time, the further actuation of the lifting apparatuses is enabled by the control signals. In this way, an even higher safety level can be achieved for the operation of the lifting system.

Furthermore, it is preferably provided that, after the release for the actuation of the lifting apparatuses by the control device, further functions are actuated. For example, lighting on the lifting system can be switched on and off. Furthermore, the selection of a load-support application mode can be selected. Further additional functions such as the operation of an additional drive system belonging to the lifting system, in particular an axle-free jack in the case of a drive-on lifting platform, an additional jack, a joint play tester, an additional unit for covering recesses in the floor, as well as a movement of individual lifting elements in relation to each other in the longitudinal direction can thus be made possible.

According to a preferred embodiment of the method, it is provided that, for lifting a vehicle, a load support of the lifting apparatus or apparatuses is actuated by the control device until it is applied against the wheel or wheels or against a chassis of the vehicle. Preferably, the lifting apparatuses of the lifting system are then actuated in a synchronised manner by the control units to lift the vehicle. This actuation mode for lifting the vehicle makes it possible for the user to carry out a visual check to ensure that the at least one load support of the lifting apparatus or apparatuses is correctly applied against the vehicle. Alternatively, it can be provided that an application phase of the load support of the lifting apparatus or apparatuses is actuated by the control device in order to apply the load support against the wheel or wheels or the chassis of the vehicle. It is advantageously provided here that an application force is queried during the application phase, this being implemented when the load support is applied against the wheels or the chassis. At a predetermined application force, the application phase is stopped. In this case, the load support of the lifting apparatus engages the wheel or wheels or the chassis of the vehicle. Before the vehicle is lifted, a confirmation is preferably requested that the load support is properly engaging the wheel(s) or chassis of the vehicle.

A further advantageous embodiment of the method provides that, when the presence signal is received by the control device, information from the opposite lifting apparatus and/or the lifting apparatuses in the lifting system is queried at the control unit and transmitted to the opposite control device and preferably optionally output on a display of the control device. This enables the user to query the current status of the opposite lifting apparatus in a simple manner. It is also possible to query the status of the lifting apparatuses integrated into the lifting system. For example, the active and/or passive circuit of the control unit can be queried, as well as other parameters, such as the height of the load supports, the number of configured lifting apparatuses and/or any faults that may occur and/or a state of charge of accumulators that are provided for autonomous operation of the lifting apparatuses.

Furthermore, it is preferably provided that the position of the user relative to the lifting apparatus, which user operates the control device, is recognised and preferably output in a display of the control device. This enables the user to easily assign the position of the user to the opposite lifting apparatus in the case of lifting systems that extend over a larger working area.

Furthermore, it is preferably provided that, for configuring the lifting system, the control device is positioned successively relative to each control unit on the lifting apparatus within the signal cone of the data interface of the control unit, and subsequently a teaching process is carried out with the lifting apparatus to be included in the lifting system, and after completion of the last teaching process, the configuration is concluded by an actuation signal. This enables a quick and easy configuration of the lifting system. In particular, mobile lifting apparatuses such as wheel grippers are provided which are arranged in pairs opposite each other to engage an axle of a vehicle. This also allows a lifting system with a plurality of lifting apparatuses, for example for multi-axle vehicles or rail vehicles, to be configured quickly in a simple manner.

The object forming the basis of the invention is further achieved by a control system for a lifting system, consisting of a plurality of lifting apparatuses, which comprises a plurality of control units and a control device, which are each formed separately from one another, wherein each control unit has a mounting interface for fastening a lifting apparatus and a user interface, wherein the control units and the control device each comprise a transmitter and a receiver for wireless transmission of control signals, and wherein a data interface for wireless transmission of a presence signal is provided on each control unit and the control device, wherein the data interface on the control unit has a signal cone which is oriented differently from the mounting interface or user interface of the control unit. Such a control system can be retrofitted to existing lifting apparatuses in order to provide a lifting system according to any of the above-described embodiments, as well as a method for controlling a lifting system according to any of the above-described embodiments. The mounting interface and/or the user interface of the control unit may be vertically oriented on a lifting column. The mounting interface is preferably designed as a mounting plate. The mounting interface can also be horizontal by means of a mounting bracket provided on the lifting column.

Figure 2:
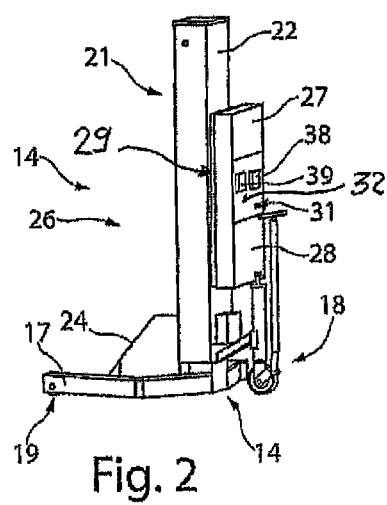
Figure 3:
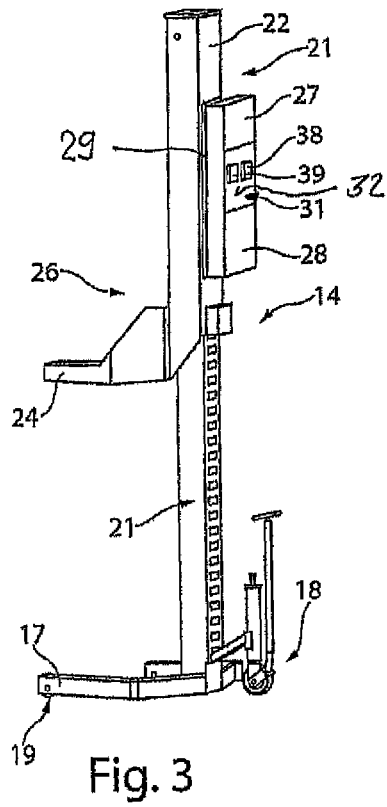
Figure 4:
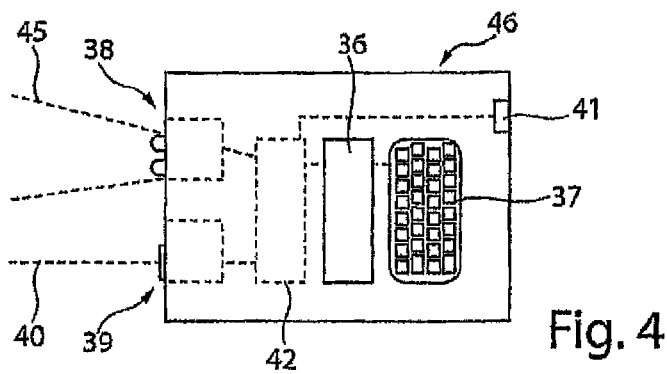
Figures 5, 6:
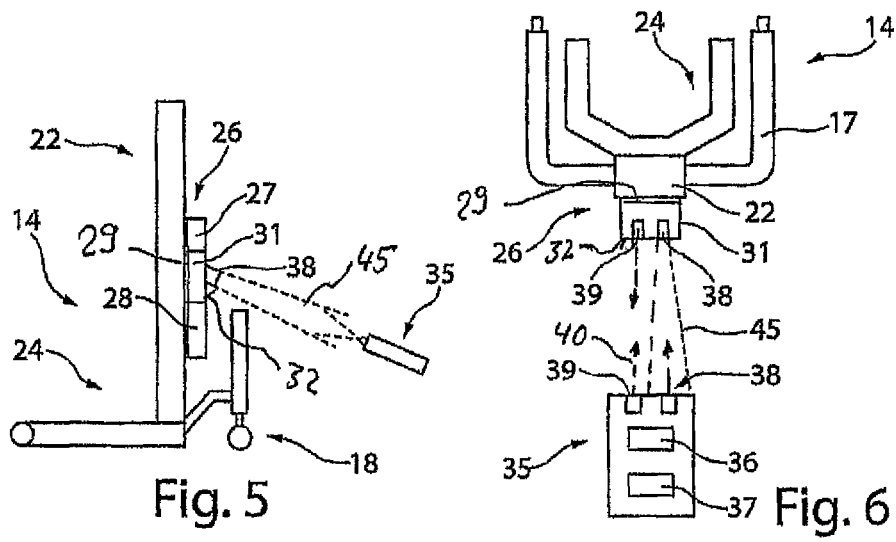
Figure 7:
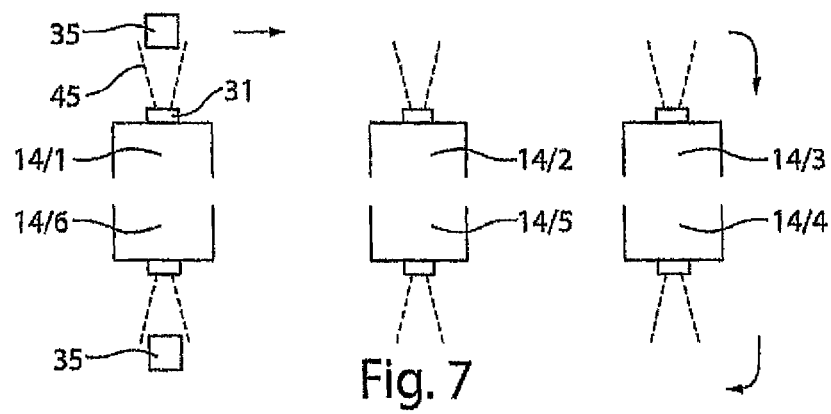
Figure 8:
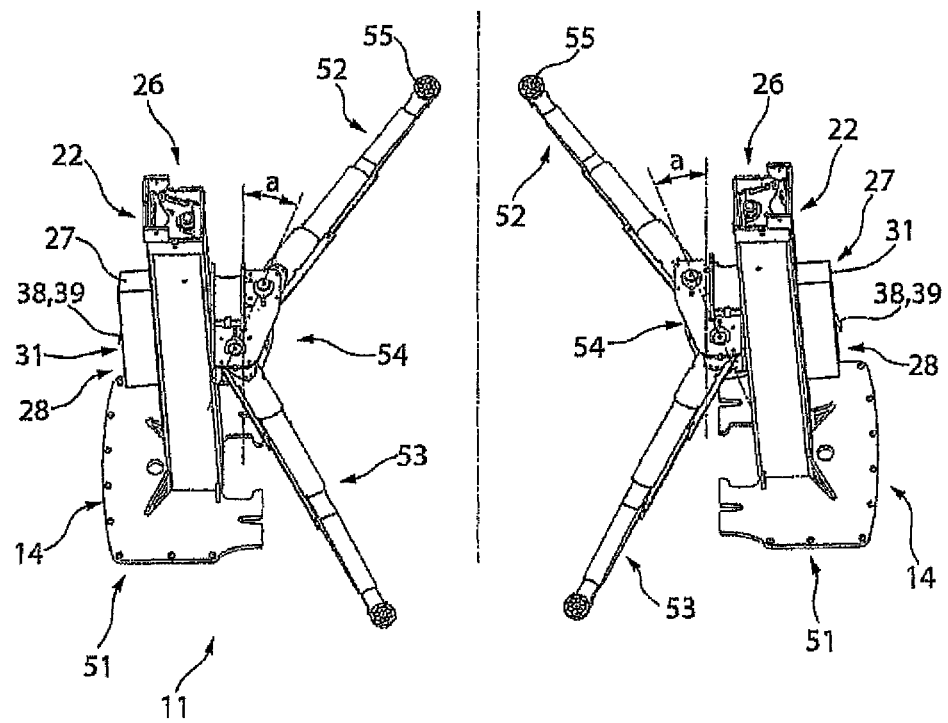
Figure 9:
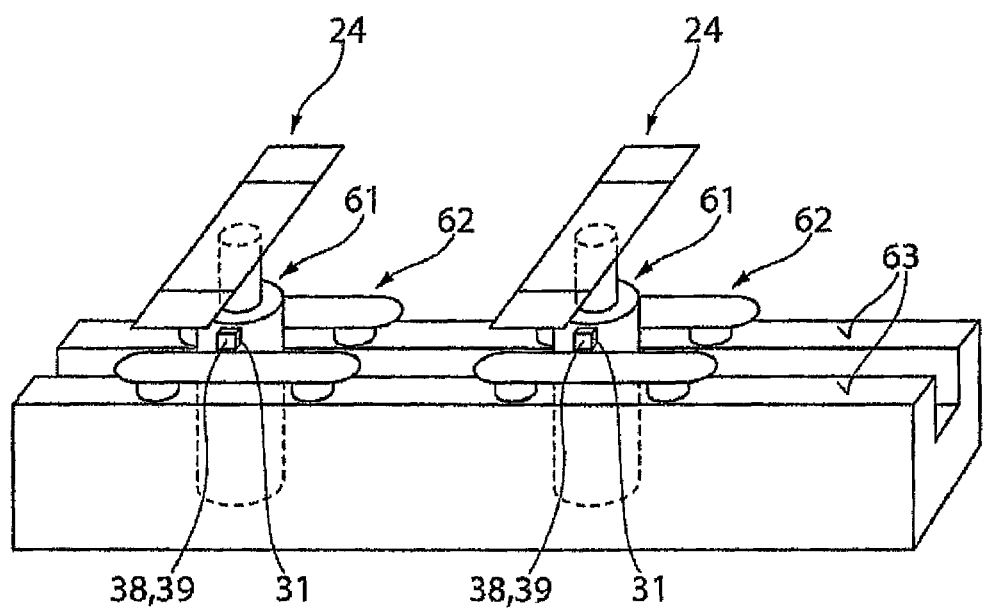
Figure 10:
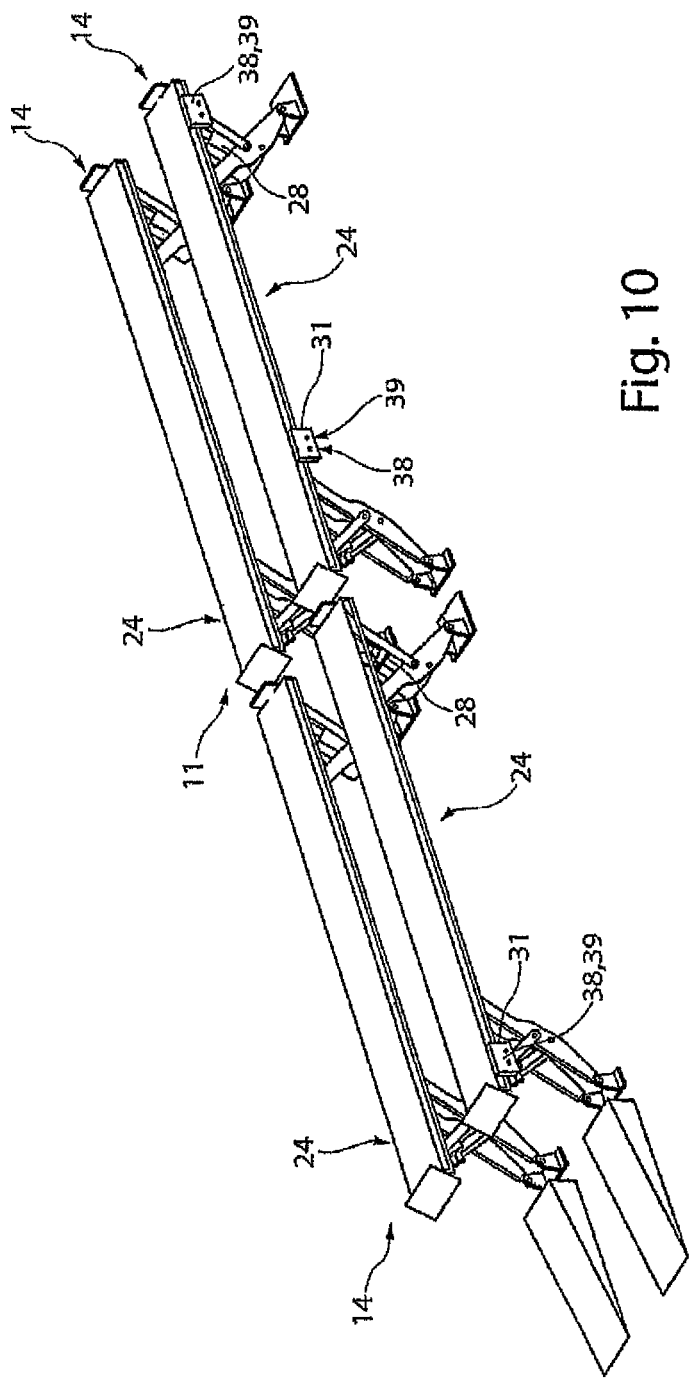

The invention and other advantageous embodiments and further embodiments thereof are described and explained in further detail below with reference to the examples shown in the drawings. The features to be taken from the description and the drawings can be applied individually or in any combination in accordance with the invention. In the drawings:

FIG. 1 shows a perspective view of a lifting system with a raised vehicle,

FIG. 2 shows a perspective side view of a lifting apparatus of the lifting system in a lowered position, FIG. 3 shows a perspective view of the lifting apparatus according to FIG. 2 in a raised position, FIG. 4 shows a schematic view of a control device of a control system of the lifting apparatus according to FIG. 1, FIG. 5 shows a schematic side view of the lifting apparatus with an control device assigned thereto for wireless communication, FIG. 6 shows a schematic top view of the arrangement according to FIG. 5, FIG. 7 shows a schematic view of the configuration of a lifting system with multiple lifting apparatuses, FIG. 8 shows a perspective view of an alternative embodiment of the lifting system to FIG. 1, FIG. 9 shows a perspective view of a further alternative embodiment to FIG. 1, and FIG. 10 shows a perspective view of a further alternative embodiment of the lifting system to FIG. 1.

FIG. 1 shows a lifting system 11. This lifting system 11 comprises a plurality of lifting apparatuses 14, which are configured to form a lifting system 11. These lifting apparatuses 14 make it possible to lift a vehicle 15, for example for maintenance, inspection and/or repair work. Alternatively, rail vehicles or other vehicles can be lifted by such a lifting system 11. Various loads can also be lifted. Each lifting apparatus 14 comprises a base frame 17 which rests on the ground. A chassis or steering chassis 18 can preferably be provided on this base frame 17. Castors 19 are preferably arranged opposite this steering chassis 18 on the base frame 17. A mobile lifting apparatus 14 is thus formed. This can be moved to the place of use.

A lifting column 21 is provided on the base frame 17. A carrier 22 can be moved up and down along the lifting column 21. A load-bearing means 24 is provided on the carrier 22. According to the embodiment, this load-bearing means is designed as a fork-shaped wheel gripper. The load-bearing means 24 can also have other alternative embodiments.

A drive unit 26 is provided on the carrier 22. This drive unit 26 can be electrohydraulic, hydraulic or mechanical or the like. This drive unit 26 comprises at least one accumulator 27. Furthermore, according to the exemplary embodiment, a hydraulic unit 28 is provided, by means of which a hydraulic cylinder within the lifting column 21 is actuated so that it can be retracted and extended. A control unit 31 is also provided on the carrier 22. The control unit 31 preferably has a mounting interface 29 which is designed to complement a connection interface on the lifting column 29. This enables easy mounting of the control unit 31. The connection interface can also be provided on the drive unit 26. The control unit 31 comprises a user interface 32, which is preferably vertically oriented. The user interface 32 is preferably oriented relative to the lifting column 21 in a manner that is easily visible and accessible to the user. The hydraulic unit 28 is actuated by this control unit 31. Such a lifting apparatus 14 is known, for example, from WO 2010/112200 A1, to which full reference is made.

The lifting system 11 comprises a control system 33, which comprises control units 31, provided one on each lifting apparatus 14. Furthermore, the control system 33 comprises a control device 35 which is designed as a mobile control device 35, in particular as a remote control. This control device 35 comprises at least one display 36 and a keypad 37. Furthermore, a data interface 38 for an evaluation signal and a transmitter/receiver 39 for a control signal are provided.

The control unit 31 also comprises a data interface 38 for the evaluation signal and, complementary to the control device 35, a receiver/transmitter 39.

According to a first embodiment, the control system 33 is designed in such a way that the control device 35 assumes the role of a master and the control units 31 on the various lifting apparatuses 14 assume the role of slaves. Each control unit 31 can be actuated individually by the control device 35. The control units 31 of the lifting apparatuses 14 in the lifting system 11, which are operated as slaves, are coupled to each other. If communication between the control device 35 and a control unit 31 is activated, a control unit 31 can be actuated as a slave by the control device 35. Subsequently, all control units 31 operated as slaves can be activated. According to one embodiment, the control units 31 operated as slaves can each receive the control signal directly from the control device 35. Alternatively, the control signal from the control device 35 can be transmitted to the opposite slave control unit 31 activated by the control device 35, and this control unit 31 forwards the control signal to the other control units 31 of the lifting apparatuses 14 integrated in the lifting system 11. In this way, the load-bearing means 24 of the lifting apparatuses 14 which are integrated in the lifting system 11 can be lifted and lowered jointly.

Alternatively, a controller 34 can be positioned in a stationary manner in a working area. This stationary controller 34 can be designed or programmed as a master. The at least one control device 35 communicates on the one hand with the stationary controller 34 designed as a master and can actuate the corresponding lifting apparatus 14 as a slave. In this case, the control device 35 forms a mobile master that communicates with the stationary controller 34.

FIG. 2 shows a schematic view of the lifting apparatus 14 in an initial position. In this embodiment, it is provided that the carrier 22 surrounds the lifting column 21. Alternatively, it may be provided that the carrier 22 is guided inside the lifting column 21.

FIG. 3 shows the lifting apparatus 14 according to FIG. 2, for example, in a working position.

The control device 35 is shown schematically in FIG. 4. This comprises the keypad 37 for entering commands. Furthermore, the display 36 is preferably provided. Both can also be integrated into each other and designed as a touch screen. The control device 35 preferably comprises a charging interface 41 for charging at least one accumulator arranged in the control device 35. Alternatively, it can be provided that the accumulators are exchangeable, so that the charging interface 41 can be omitted. Furthermore, the control device 35 comprises a microcontroller 42, by means of which data processing as well as output and reception of presence and control signals takes place. Furthermore, the control device 35 comprises a data interface 38 through which a presence signal is output or received. This data interface 38 is preferably equipped with an infrared transmitter and/or an infrared receiver, so that an infrared signal can be output and received as a presence signal. Furthermore, the control device 35 comprises a transmitter/receiver 39. Preferably, the reception and transmission of radio signals as control signals is provided.

The direction of the control signals of the transmitter/receiver 39 and the data interface 38 are preferably oriented identically on a housing 46, in particular on an end face of the housing 46. This means that a signal cone 45 of the presence signal as well as a signal direction 40 or a signal cone of radio signals as a control signal are oriented identically.

FIG. 5 shows a schematic side view of the lifting apparatus 14. The data interface 38 for the presence signal is provided on the control unit 31. The signal cone 45 of the data interface 38 is inclined here downwards with respect to a horizontal line. This can preferably be achieved by the orientation of the data interface 38 itself or by means of optical elements. By inclining the signal cone 45 downwards with respect to the horizontal, the advantage is achieved that other signals transmitted in an area of the lifting system 11 are not detected or are detected only with difficulty.

FIG. 6 shows a top view of the arrangement according to FIG. 5. From these two views according to FIGS. 5 and 6, it is clear that a defined arrangement of the control device 35 relative to the control unit 31 is required to actuate the control unit 31 on the lifting apparatus 14 with the control device 35. The control device 35 must be aligned with the data interface 38 and the transmitter/receiver 39 must be oriented towards the data interface 38 of the control unit 31 and the transmitter/receiver 39 of the control unit 31. It is further required that the control device 35 is to be positioned within the signal cone 45 of the data interface 38 of the control unit 31. This allows the operator holding the control device 35 to be outside a working area. Furthermore, the operator can also be remote from the lifting apparatus 14 to actuate the lifting system 11.

The working area of the lifting system 11 is formed by two lifting apparatuses 14 opposite each other, or, as shown in FIG. 1, by four lifting apparatuses 14 assigned to each other or a plurality of lifting apparatuses 14 assigned to each other or by a surface below the vehicle 15 to be lifted.

The control device 35 emits a presence signal and a control signal. Provided that these two signals are received and processed by the control unit 31 within a time window, in particular simultaneously, the control unit 31 is active. Subsequently, the control signal can be forwarded to the drive unit 26 for operating the lifting apparatus 14. If a time-delayed reception of the presence signal from the data interface 38 of the control unit 31 and of the control signal from the transmitter/receiver 39 is detected by the control unit 31, the control unit 31 remains inactive.

The control device 35 can actuate lifting, lowering, an emergency stop, a selection of the actuatable lifting apparatuses, a configuration of the corresponding lifting system with a code number during commissioning, a switching on/off of a lighting on the lifting system, a selection of a load-support application mode, an actuation of a motorised propulsion drive, a lifting apparatus and a selection of a radio channel.

This control device 35 also enables communication with external networks and the display of information, e.g. operator guidance, operating instructions, service instructions. Remote maintenance or remote diagnosis can also be actuated or carried out. It is also possible that this control device 35 is used for a software update of the control units 31 on the lifting apparatuses 14.

Preferably, at least one display 36 is also provided on each control unit 31 to read an operating status. Preferably, a keypad 37 or a combination of the display 36 and keypad 37 as a touch screen can also be provided on the control unit 31. This can also provide the option of directly actuating the lifting system 11 via the control unit 31.

If at least one control unit 31 is activated by the control device 35, the data and/or information of the at least one control unit 31 can also be called up and/or shown on the display of the control device 35.

FIG. 7 shows a schematic view of the configuration of, for example, three lifting apparatuses 14 positioned in pairs opposite each other to form a lifting system 11. To configure these lifting apparatuses 14 to form a lifting system 11, the control device 35 is assigned to a first lifting apparatus 14/1. Preferably, the control device 35 recognises that it is assigned to the lifting apparatus 14/1. Subsequently, the programme mode "configuration" is called up. The control device 35 is then preferably positioned relative to the control unit 31 in the position shown in FIGS. 5 and 6. The further communication between the lifting apparatus 14/1 and control device 35 is enabled by the presence signal and control signal received within the time window. After completion of the teaching process, this process is acknowledged and the control device 35 is aligned to the lifting apparatus 14/2. The preferred recognition of the assignment and the subsequent teaching process is repeated. This is carried out successively for the lifting apparatus 14/3, 14/4, 14/5 and 14/6. Subsequently, the completion for the configuration is confirmed. The control system 33 is thus configured for six lifting apparatuses 14. This lifting system 11 can be actuated by means of the control device 35 via each configured lifting apparatus 14 or the operating status can be queried.

FIG. 8 shows a perspective view of an alternative embodiment of the lifting apparatuses 14 of the lifting system 11 to FIG. 1. In this embodiment, the lifting apparatuses 14 are stationary. These lifting apparatuses 14 have a base plate 51 which is fixedly connected to a floor. For example, a screw connection can be used. The lifting column 21 is fastened to the base plate 51. The drive unit 26, the accumulator 27, the hydraulic unit 28 and the control unit 31 are provided on the lifting column 21 analogously to the lifting apparatuses 14 in FIGS. 1 to 6.

In this embodiment, the load-bearing means 24 is designed differently from the load-bearing means 24 shown in FIGS. 1 to 3. The load-bearing means 24 according to FIG. 8 has a first support arm 52 and a second support arm 53, which are preferably provided independently of each other and pivotably on a carrier 54. The carrier 54 can be moved up and down along the lifting column 21. The support arms 52, 53 are preferably telescopic. A support element 55 is provided at the outer end of each support arm 52, 53 and engages a chassis of a vehicle in an application position to lift the vehicle.

The control unit 31 is again oriented opposite the load-bearing means 24.

The above explanations regarding the configuration of the lifting system 11 according to FIG. 8 as well as the communication of the control device 35 with the control unit 31 and/or the configuration of the lifting system 11 correspond to the above-described embodiment according to FIGS. 1 to 7.

FIG. 9 shows a perspective view of another alternative embodiment of the lifting system 11 to FIG. 1 and FIG. 8. In this embodiment, the lifting apparatuses 14 are designed as an underfloor lifting apparatus. Each lifting apparatus 14 comprises a ram 61 by which the load support 24 can be moved up and down. This ram 61 is preferably provided on a movable carriage 62, which is movable along running rails 63, which are preferably recessed with respect to a floor of a working area. This arrangement allows the lifting apparatuses 14 to be movable along the running rails 63 and individually adjustable to the length of the vehicle.

The control unit 31 is provided on a housing of the ram 61. The data interface 38 arranged on the control unit 31 and/or the transmitter/receiver 39 points laterally outwards so that each lifting apparatus 14 communicates with the control device 35 and can be controlled. The control of the lifting apparatuses 14 described above as well as the configuration of the lifting system 11 corresponds in analogy to the embodiments described above.

FIG. 10 shows a perspective view of an alternative embodiment of the lifting system 11 to FIG. 1. In this lifting system 11, the lifting apparatuses 14 are designed as rail lifting apparatuses. Each of these lifting apparatuses 14 has a rail as a load support 24. Two opposing lifting apparatuses 14 with rails oriented in parallel form the lifting system 11. In the case of long vehicles with trailers or also in the case of a plurality of rail vehicles, a plurality of lifting apparatuses 14 can be arranged in series with each other. A control unit 31 is provided on each of these lifting apparatuses 14. In particular, a control unit 31 can be provided on each load support 24, in particular rail of the lifting apparatus 14. This control unit 31 can also be integrated within a profile of the rail. Preferably, a window can then be provided in a side cheek of the rail, in which window the data interface 38 and the transmitter/receiver 39 of the control unit 31 are positioned. This allows lateral accessibility to the lifting apparatus 14, i.e. communication of the control device 35 with the control unit 31 can take place outside the working area. These lifting apparatuses 14 can be actuated and/or configured analogously to the lifting apparatuses 14 according to the first embodiment in FIGS. 1 to 7.

The invention claimed is:

1. A lifting system, which comprises
   a plurality of lifting apparatuses which are actuatable by means of a control system, the control system comprising
   a control device and
   a plurality of control units, each control unit provided on a respective lifting apparatus and actuating a load-bearing means of the respective lifting apparatus, wherein
   the control device being provided separately from the control units, and
   each control unit and the control device include a transceiver configured for a wireless transmission and/or receipt of the control signal and/or a presence signal, wherein
      a data interface for the wireless transmission of the presence signal is provided on each control unit and on the control device, and
      the data interface on the control device is configured to produce a signal cone which is oriented differently from the load-bearing means, wherein
         the control device is positioned within the signal cone of the data interface of a respective control unit; and
         the respective control unit releases the actuation of a respective lifting apparatus upon receipt of the presence signal and the control signal from the control device within a time window.

2. The lifting system according to claim 1, wherein:
a working area is formed between two lifting apparatuses arranged opposite each other or a plurality of lifting apparatuses arranged opposite each other in pairs and the signal cone of the data interface of the control unit lies outside this working area and/or; and
the signal cone of the data interface provided on the control unit is oriented oppositely to the load-bearing means.

3. The lifting system according to claim 1, wherein:
the signal cone of the data interface of one or more of the control units is oriented horizontally or is oriented inclined downwards with respect to a horizontal line and/or
the signal cone of the data interface and a signal direction of the transceiver for the control signal are oriented identically.

4. The lifting system according to claim 1, wherein:
the data interface for the presence signal is formed by an IR receiver; and
the transceiver is configured for a wireless transmission and/or receipt of the control signal are formed differently relative to the data interface.

5. The lifting system according to claim 1, wherein one or more of the control units has a display for showing at least one operating status and/or a keypad and/or a charging interface.

6. The lifting system according claim 1, wherein the control device communicates with the control unit within the signal cone of the data interface and activates the control unit for actuating the lifting apparatus upon a simultaneous reception of the presence signal and the control signal from the control device.

7. The lifting system according to claim 1, wherein the control device is designed as a master and the control units as slaves.

8. The lifting system according to claim 1, wherein the control device is designed as a portable hand-held device.

9. The lifting system according to claim 1, wherein a plurality of control devices are provided in the control system and are coupled to each other.

10. The lifting system according to claim 1, wherein a control device communicates with a stationary controller in a working area of the at least one lifting system, which stationary controller is designed as a master and/or as a communication interface.

11. A method for controlling a lifting system comprising a plurality of lifting apparatuses, each of which has a load-bearing means which is movable up and down, the method comprising:
activating a control system configured to actuate the plurality of lifting apparatuses, wherein the control system consists includes a control device and a plurality of control units arranged separately therefrom and one on each lifting apparatus,
the control device and the control units each have a transceiver by means of which control signals are transmitted and received wirelessly, wherein
the control device and the control units each have data interfaces by means of which at least one presence signal is transmitted between the control device and a respective control unit, and
the control device is positioned within a signal cone of the data interface of the respective control unit, and
the respective control unit releases the actuation of the lifting apparatus upon receipt of the presence signal and the control signal from the control device within a time window.

12. The method according claim 11, wherein the presence signal is different from the control signal.

13. The method according to claim 11, wherein
after the control unit has been enabled to actuate the lifting apparatuses by the control device, further functions of the lifting apparatuses are actuated, and wherein
when lifting a vehicle, the load-bearing means of the lifting apparatus is actuated by the control device until it is applied against a wheel or wheels or against a chassis of the vehicle, and subsequently the lifting apparatuses of the lifting system are actuated in a synchronized manner by the control units to lift the vehicle.

14. The method according to claim 11 wherein on reception by the control device of the presence signal output by the data interface, information at the opposite lifting apparatus and/or the lifting apparatuses in the lifting system is queried by the control unit, by the opposite control device, and transmitted to this control device, and selectively output on a display of the control device.

15. The method according to claim 14, wherein the position of a user relative to the lifting apparatus, which user operates the control device, is recognized by the control device and output in the display of the control device.

16. The method according to claim 11, wherein in order to configure the lifting system, the control device is positioned successively with respect to each control unit of the lifting apparatus to be incorporated in the lifting system within the signal cone of the data interface of the control unit and a teaching process is then carried out with the lifting apparatus to be incorporated in the lifting system and, after completion of the last teaching process of the lifting apparatus to be incorporated, the configuration of the lifting system is concluded by a confirmation signal.

17. A lifting system for lifting and lowering a vehicle, the lifting system comprising:
a plurality of lifting apparatuses surrounding the vehicle, each lifting apparatus configured for actuation by a control system, the control system comprising:
a control device positioned separately from the vehicle and the plurality of lifting apparatuses;
a plurality of control units, each control unit provided on a respective lifting apparatus and configured for actuating a wheel gripper of the respective lifting apparatus, the control device configured to transmit a control signal and thereby control operation of the plurality of control units, wherein:
the control device is positioned separately from the control units, and
each control unit and the control device include a transceiver configured for a wireless transmission and/or receipt of the control signal and/or a presence signal that differs from the control signal, wherein
a data interface for the wireless transmission of the presence signal is provided on each control unit and on the control device, and
the data interface on the control device is configured to produce a signal cone that is positioned opposite from the wheel gripper, wherein:
the control device is aligned with the data interface of the control device and oriented towards the transceiver of one or more control units; and the control device is positioned within the signal cone of the data interface of one or more control units, wherein positioning of the control device within the signal cone of the data interface of one or more control units permits an operator holding the control device to be outside of the vehicle; and each control unit is configured to enable actuation of the wheel gripper of a respective lifting apparatus upon simultaneous receipt of the presence signal via the data interface of the control device and the control signal via the transceiver of the control device.

\* \* \* \* \*